US007000854B2

(12) United States Patent
Malek et al.

(10) Patent No.: US 7,000,854 B2

(45) Date of Patent: Feb. 21, 2006

(54) PULLOUT SPRAY HEAD WITH SINGLE-BUTTON MODE SELECTOR

(75) Inventors: Michael L. Malek, North Olmsted, OH (US); W. Randall Tucker, Oberlin, OH (US); Peter Bates, Framingham, MA (US); Gaurav Rohatgi, Franklin, MA (US)

(73) Assignee: Moen Incorporated, North Olmsted, OH (US)

(*) Notice: Subject to any disclaimer, the term of this patent is extended or adjusted under 35 U.S.C. 154(b) by 66 days.

(21) Appl. No.: 10/291,157

(22) Filed: Nov. 8, 2002

(65) Prior Publication Data

US 2004/0112985 A1 Jun. 17, 2004

(51) Int. Cl.
*A62C 31/00* (2006.01)
*F16K 11/14* (2006.01)

(52) U.S. Cl. ...................... 239/445; 239/525; 239/448; 239/449; 239/569; 137/871; 137/625.48

(58) Field of Classification Search ................ 239/530, 239/525, 443, 445, 447, 448, 449, 569; 137/867, 137/868, 871, 878, 625.48; 251/613, 230
See application file for complete search history.

(56) References Cited

U.S. PATENT DOCUMENTS 2,314,071 A 3/1943 Bucknell et al.
3,545,473 A 12/1970 Moia
3,656,503 A * 4/1972 Ward .......................... 137/359
3,722,525 A 3/1973 Epple
4,029,119 A 6/1977 Klieves
4,224,962 A * 9/1980 Orszullok ................... 137/465
4,606,370 A * 8/1986 Geipel et al. ......... 137/119.005
RE32,981 E 7/1989 Marty
4,927,115 A 5/1990 Bahroos et al.
4,934,402 A 6/1990 Tarnay et al.
5,069,241 A * 12/1991 Hochstrasser .......... 137/119.05
5,445,182 A 8/1995 Sturman et al.
5,649,562 A 7/1997 Sturman et al.
5,858,215 A 1/1999 Burchard et al.
6,007,003 A * 12/1999 Wang ......................... 239/525
6,151,729 A * 11/2000 Yean ............................. 4/675
6,220,297 B1 4/2001 Marty et al.
6,290,147 B1 9/2001 Bertrand et al.
6,296,011 B1 * 10/2001 Esche et al. ........... 137/355.25
6,370,713 B1 4/2002 Bosio
6,659,373 B1 * 12/2003 Heren et al. ................ 239/570

* cited by examiner

*Primary Examiner*—David A. Scherbel
*Assistant Examiner*—Seth Barney
(74) *Attorney, Agent, or Firm*—Calfee, Halter & Griswold LLP

(57) ABSTRACT

A spray head for a faucet or the like has a wand body defining a flow path from an inlet to first and second outlets. Diverter seats are provided so a face seal on a diverter spool can direct flow to the first or second outlet. The spool is positioned by a trigger acting on cam surfaces formed on a toggle. A spring biases the toggle to one of two stable states. Movement of the spool by the trigger causes the toggle to change states so subsequent actuation of the trigger causes the spool to move in the opposite direction. The wand body also has a pause button that reciprocates in a chamber that is part of the flow path. The chamber includes a valve seat and the pause button has a spool having a face seal that is engageable with the valve seat to shut off flow through the spray head. A return spring causes separation of the pause button's face seal upon release of pressure on the pause button. The pause button's seals in the chamber are arranged to have equal diameters and thus provide balanced hydraulic forces on the spool.

12 Claims, 8 Drawing Sheets

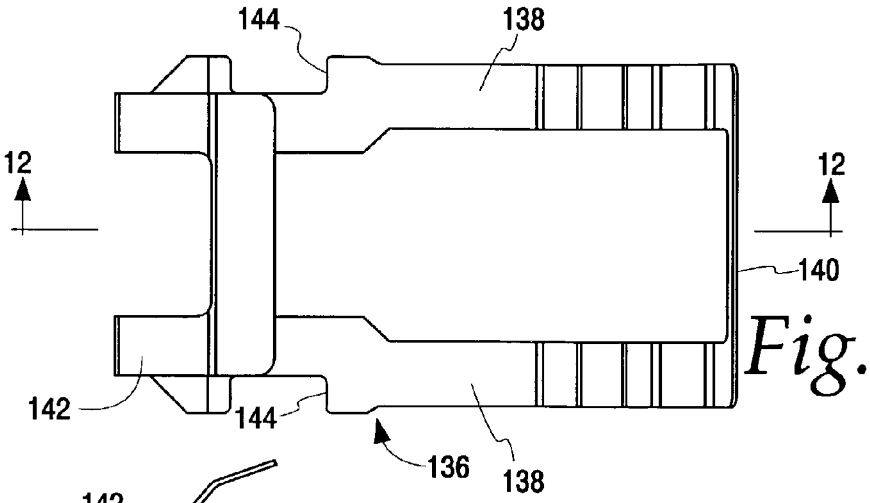
*Fig. 11*
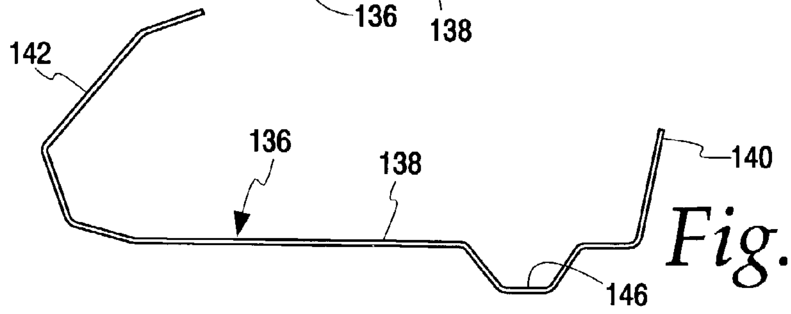
*Fig. 12*
*Fig. 15*
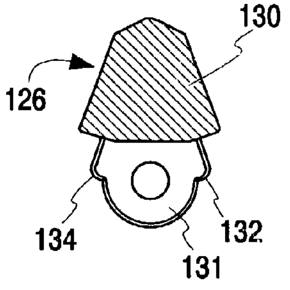
*Fig. 13*
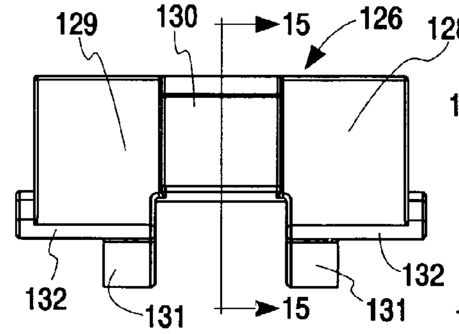
*Fig. 14*
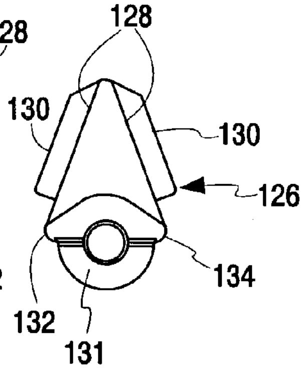
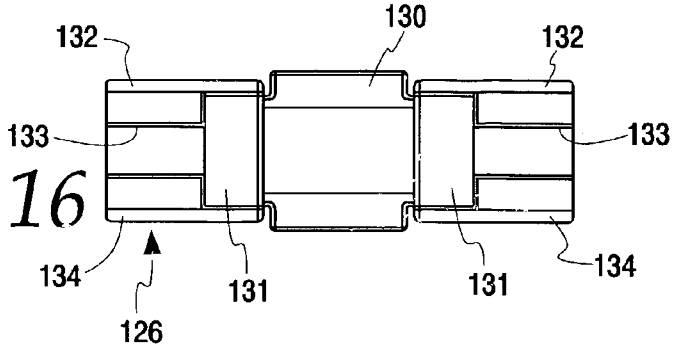
*Fig. 16*

PULLOUT SPRAY HEAD WITH SINGLE-BUTTON MODE SELECTOR

BACKGROUND OF THE INVENTION

This invention relates to faucets and is particularly concerned with a faucet having a pullout spray head or wand connected to a flexible water supply tube. The spray head can be mounted on a fixed base unit or it can be detached from the base unit and pulled out to allow a user to direct water to any desired location.

It is often desirable to provide a spray head with more than one water delivery mode. Multiple delivery modes may include a spray mode and a stream mode. In the spray mode water is discharged in a relatively wide spray pattern comprising a large number of small, individual streams. In the stream mode water is discharged in a single, relatively narrow, concentrated stream. Multiple modes of this type are particularly useful in kitchen faucets, although their use is not limited to kitchens. Lavatories, showers or any other faucet, including a garden hose, may benefit from this feature.

Multiple water delivery modes are commonly provided in fixed faucets by means of a nozzle having a push-pull feature that switches the nozzle between spray and stream modes. Pullout spray heads are known that require the user to hold a button in a depressed state to get an alternate mode. See U.S. Pat. No. 6,370,713. Other spray heads require that separate buttons and/or levers be pushed to change from one mode to another. Examples are U.S. Pat. Nos. 6,220,297, 5,858,215 and 6,290,147. Still other designs use a rocker switch that require opposite ends of the rocker to be pushed to change modes. Non-pullout faucets sometimes change modes by requiring a lever to be slid or twisted, or by requiring opposing actions on a slide. Shower spray heads are known that produce different spray patterns by requiring a dial type device or a lever to be twisted in different directions to change spray modes. Garden hose nozzle designs also typically have a dial type device for changing spray modes.

One difficulty that can occasionally arise in the use of pullout spray heads is the need to momentarily shut off the water or alter its temperature. If the user is grasping the spray head in one hand and has another item, such as a pan or dish, in the other hand then there is no convenient way to manipulate the water controls. The choices are to put the pan or the spray head down, return the spray head to its base, or try to manipulate the controls with a portion of a hand that is still grasping an item. For example, a user might try to manipulate the controls with the palm of a hand while the fingers of that hand retain the spray head. Perhaps an ambitious user might try to actuate the water controls with an elbow. Obviously none of these are convenient. What is needed is a water control incorporated into the spray head. The present invention provides such a control in the form of a pause button.

SUMMARY OF THE INVENTION

The present invention is concerned with a pullout spray head which provides multiple water discharge spray patterns or modes and which permits momentary shut off of water flow with a pause button. The mode is selected by means of a single action at a single point of actuation. The user is not required to hold the actuating device in place while using the various modes. The mode is changed simply by pressing the same button, in the same direction, with each successive actuation of the button changing the discharge mode. The spray head will remain in the selected mode until another actuation of the button or until the water is turned off, at which time the spray head reverts to a home position or mode.

The spray head of the present invention also includes a pause button that momentarily interrupts the water while the pause button is depressed. The button must be held in the depressed position to keep the flow interrupted. Release of the pause button reactivates water flow. The force necessary to actuate the pause button is independent of the water pressure, within the limits of normal household operating pressures (which range from about 10 psi to 125 psi). The pause button is especially useful when the spray head is pulled out because the primary on/off control valve may often be an inconvenient distance from the spray head. The pause feature is also useful in two-handle faucet designs where resetting of the hot/cold ratio may also be inconvenient. The pause feature is applicable to all discharge modes of the faucet.

BRIEF DESCRIPTION OF THE DRAWINGS

FIG. 11 is a top plan view of the trigger spring, on an enlarged scale.

FIG. 12 is a section taken along line 12—12 of FIG. 11.

FIG. 13 is a front elevation view of the toggle wedge, on an enlarged scale.

FIG. 14 is an end elevation view of the toggle wedge.

FIG. 15 is a section taken along line 15—15 of FIG. 13.

FIG. 16 is a bottom plan view of the toggle wedge.

DETAILED DESCRIPTION OF THE INVENTION

Figure 2:
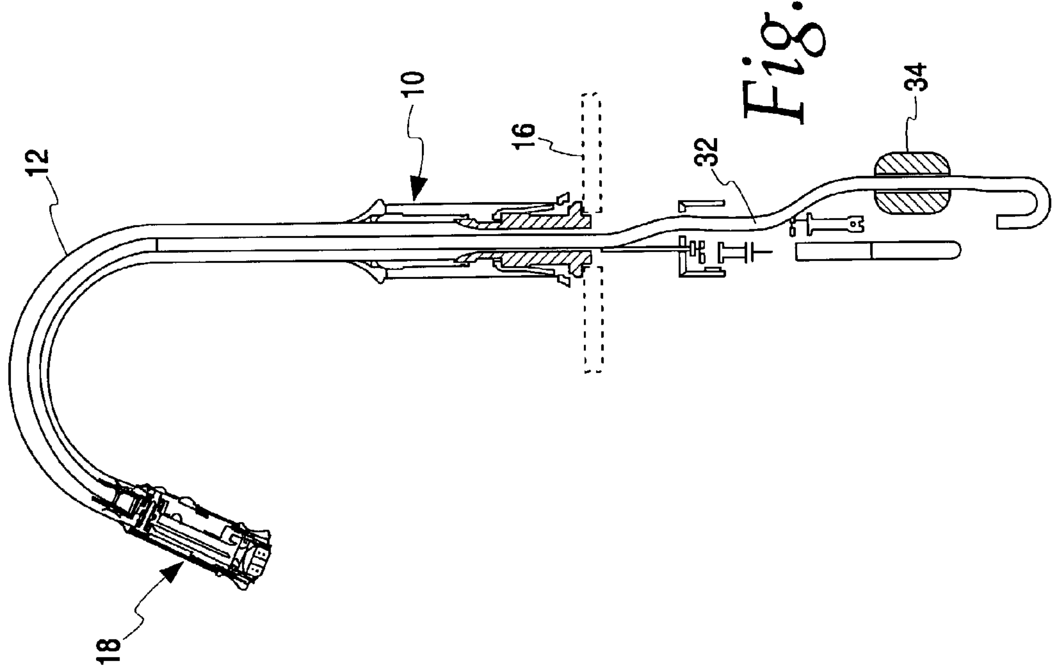
FIG. 2 is a schematic section through the faucet of FIG. 1.
Figure 1:
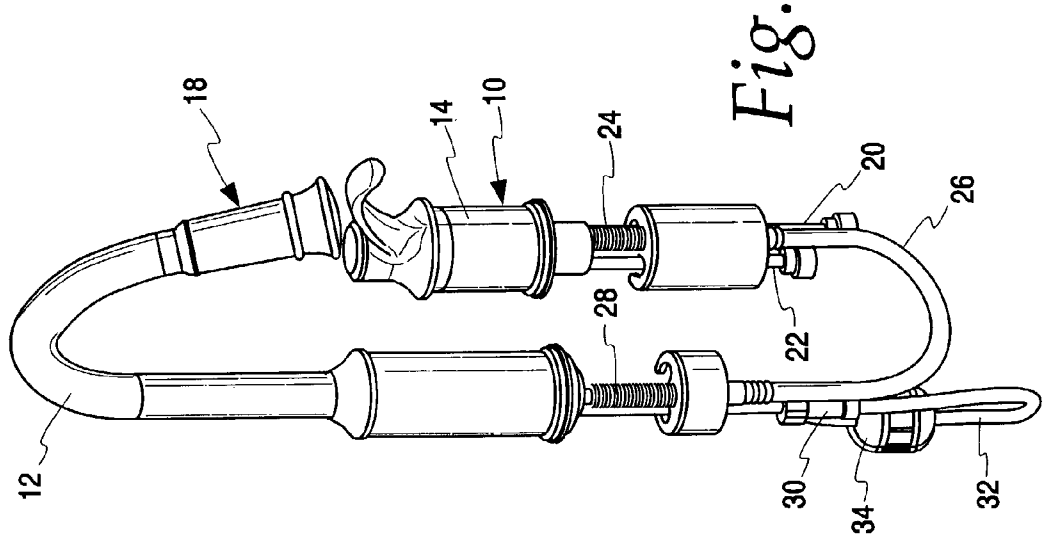
FIG. 1 is a perspective view of a single handle, high arc pull down faucet incorporating the pullout spray head of the present invention.

FIGS. 1 and 2 illustrate a faucet generally at 10 which incorporates the pullout spray head or wand of the present invention. The faucet 10 includes a gooseneck spout 12 and a single handle mixing valve 14, both of which are mounted above a deck, which is shown schematically at 16. The pullout spray head 18 is shown in its docked position at the distal end of the spout 12. Below the deck are hot and cold water supply lines 20, 22, a mixed water outlet pipe 24, a transfer line 26, and a mixed water inlet pipe 28. A quick connect 30 is connected to the inlet pipe. A flexible hose 32 is attached to the quick connect 30 and extends through the hollow interior of the spout to join the spray head 18. The hose has a weight 34 on it to assist in drawing the hose back into the spout during docking.

Figure 3:
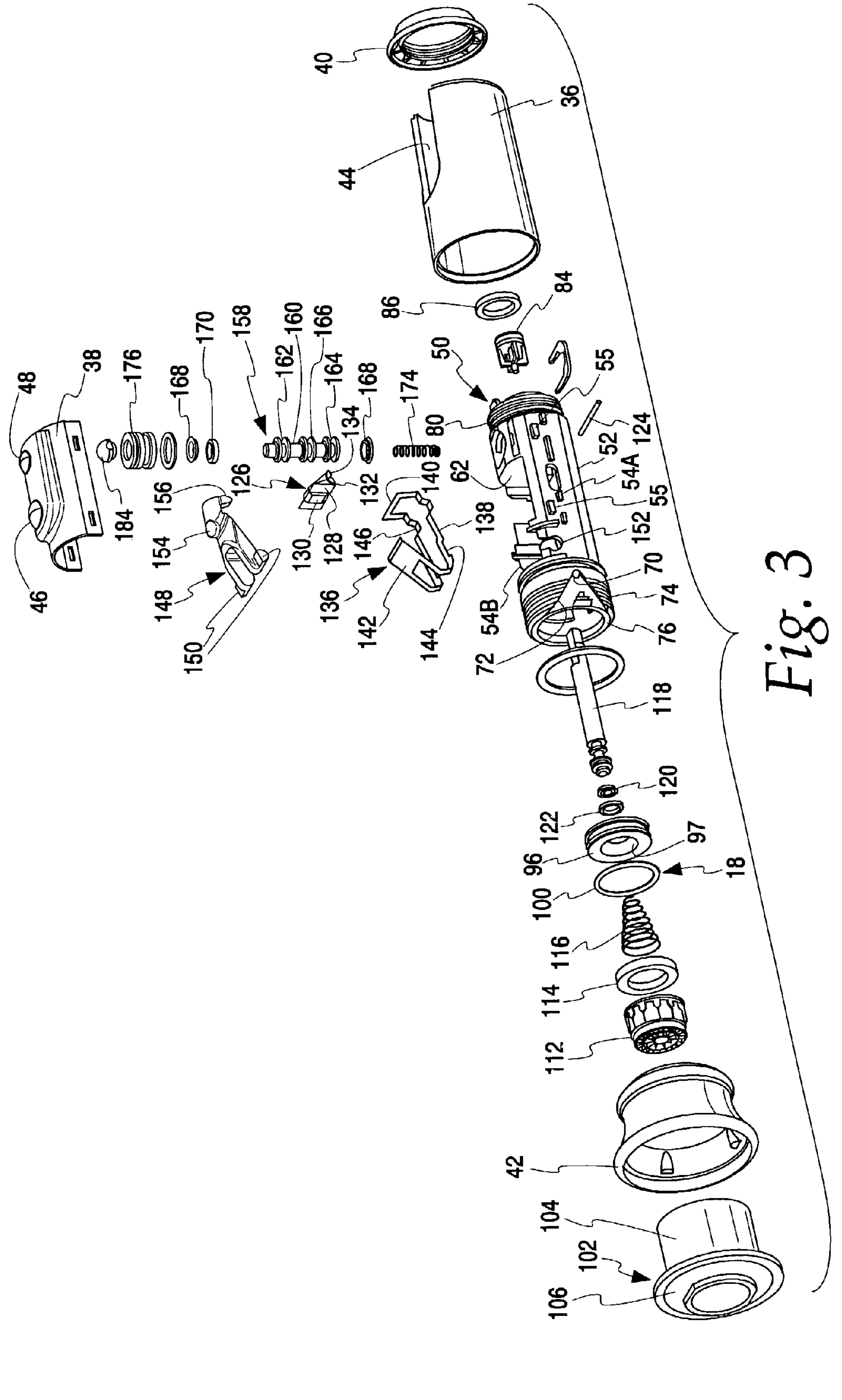
FIG. 3 is an exploded perspective view of the pullout spray head.
Figure 4:
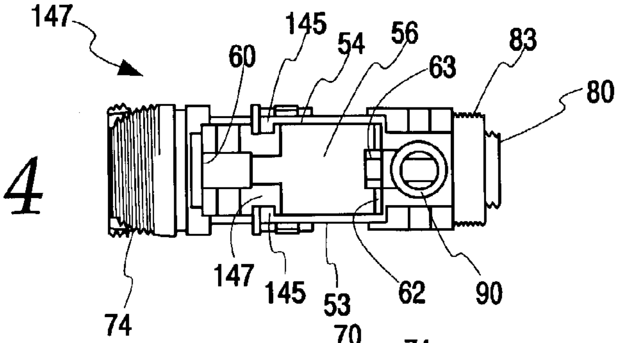
FIG. 4 is a top plan view of the wand body.
Figure 5:
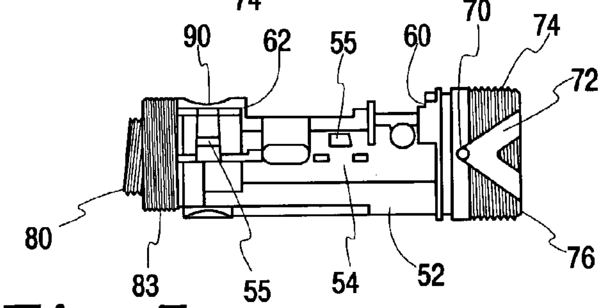
FIG. 5 is a side elevation view of the wand body.
Figure 6:
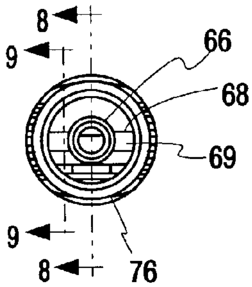
FIG. 6 is an end elevation view of the wand body.

FIG. 3 illustrates the pullout spray head 18 of the present invention. The exterior components include a main cover 36, a trigger cover 38, a ring 40 at the proximal end of the spray head and a tip 42 at the distal end. As used herein proximal refers to a position or direction toward the portion of the spray head nearest the hose attachment point. Distal refers to a position or direction toward the portion of the spray head nearest the water discharge point. The exterior parts have suitable decorative finishes. The ring 40 is sized to permit it to releasably connect to the end of the spout 12 for the purpose of docking the spray head to the spout. The main cover 36 has a slot 44 for receiving the trigger cover 38. The trigger cover is made of flexible material and has a trigger dome 46 and a pause dome 48.

Figure 10:
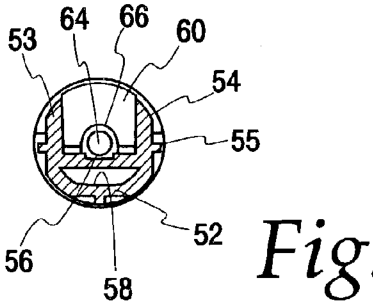
FIG. 10 is a section taken along line 10—10 of FIG. 6.

The exterior components surround a wand body 50. Details of the wand body are shown in FIGS. 4–10. The body has an arcuate bottom wall 52 which joins two upstanding, flat side walls 53, 54. The side walls have projecting tabs 55 that engage retention slots in the trigger cover 38 to hold the cover in place. A floor 56 extends between the lower edges of the two side walls. Thus, the floor 56 forms a chord across the arcuate bottom wall 52, as best seen in FIG. 10. Together the bottom wall and floor define a main water flow path 58. The ends of the side walls are joined by front and rear transverse walls 60 and 62. The rear transverse wall 62 has a pocket 63 formed just above the floor. The front wall has a bore 64 therethrough defined by a sleeve 66. The forward or distal end of the sleeve defines a first diverter seat 68. There are also two laterally extending, hollow embossments 69 (FIG. 9) on the distal face of the front wall 60. These embossments have branch passages 71 therein that are in fluid communication with the bore 64. The branch passages have openings in the sides of the body, one of which is shown at 70 in FIG. 5. The openings 70 communicate with V-shaped notches 72 cut into threads 74 formed on the exterior of a threaded annular outlet wall 76. The outlet wall merges with the front transverse wall 60 and the arcuate bottom wall 52, roughly at the location of an O-ring seal 78.

Figure 8:
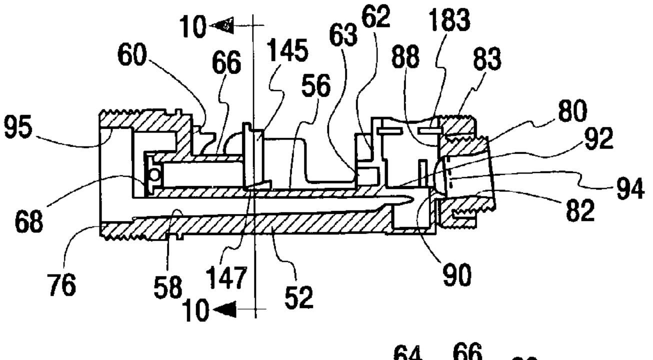
FIG. 8 is a section taken along line 8—8 of FIG. 6.
Figure 9:
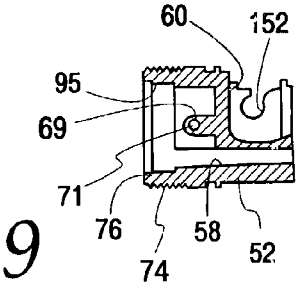
FIG. 9 is a section taken along line 9—9 of FIG. 6.

At the proximal end of the wand body there is a threaded annular inlet wall 80 defining an inlet 82. The hose can be attached to the inlet wall. The inlet wall is surrounded by a threaded outer sleeve 83 which may be used to attach the wand ring 40. The inlet wall 80 preferably may house a check valve 84 and a screen washer 86 (FIG. 3). The inlet wall 80 merges with the bottom wall 52, side walls 53, 54 and an upstanding interior wall 88 (FIG. 8). These walls, together with the proximal face of the rear transverse wall 62 define a pause chamber 90. The pause chamber has an axis that is generally perpendicular to that of the wand body 50. The pause chamber houses the pause button as will be described below. A circular valve seat 92 is formed in the walls forming the pause chamber. The interior wall 88 has a port 94 through it to provide fluid communication from the inlet 82 to the pause chamber 90. It will be noted that the pause chamber also communicates with the main flow path 58 and thus becomes part of the main flow path.

Returning again to FIG. 3 and the distal end of the spray head 18, the inner surface of the outlet wall 76 has an undercut 95 into which fits a poppet valve seat 96. This ring-shaped member has a central opening 97. The V-shaped opening 97 provides a second outlet from the body, the first outlet being the side openings 70. A second diverter seat 98 is formed on the inner surface of the poppet valve seat 96. An O-ring 100 placed about the outer circumference of the seat 98 seals against the inner surface of the outlet wall's undercut portion.

A spray former 102 is attached to the outlet wall 76. The spray former has an outer annular skirt 104 with internal threads that engage threads 74. It will be noted in FIG. 18 that the skirt engages a lip on the interior of the wand tip 42 to hold the tip against the wand cover 36. The junction between the skirt 104 and the wand body is sealed by an O-ring 78. A radial end surface 106 extends from the outer skirt 104 to an inner annular ring 108 which is attached to the end surface so as to be concentric with the skirt. There is a gap between the inner ring 108 and the outer skirt 104 which communicates with a plurality of small individual outlet openings 110 through the end surface 106. These openings produce the spray mode of the spray head 18.

The interior of the inner ring mounts an aerator 112. A face seal 114 is placed between the aerator 112 and the distal radial face of the poppet valve seat 96. This seal prevents leakage from the opening 97 in the poppet valve seat to the gap between the spray former's inner ring 108 and outer skirt 104. Thus, when the spray head is in stream mode, water cannot find its way to the spray mode openings 110. A cone spring 116 surrounds the aerator and has its large end bottomed against the end surface 106 of the spray former. The cone spring extends through the opening 97 in poppet valve seat 96 to engage the diverter spool as will be explained below.

Figure 18:
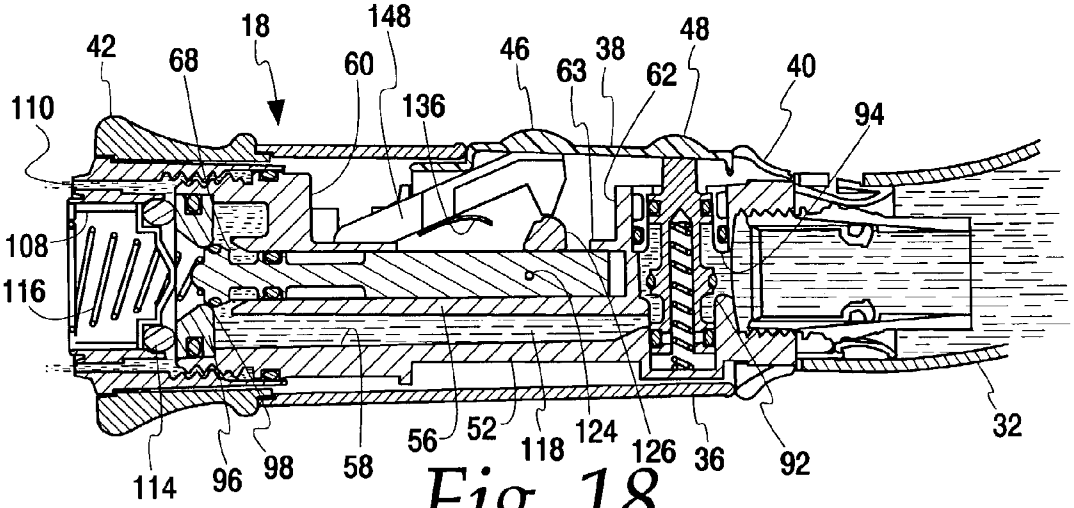
FIG. 18 is a section through the spray head assembly, showing the diverter in the spray mode position.
Figure 19:
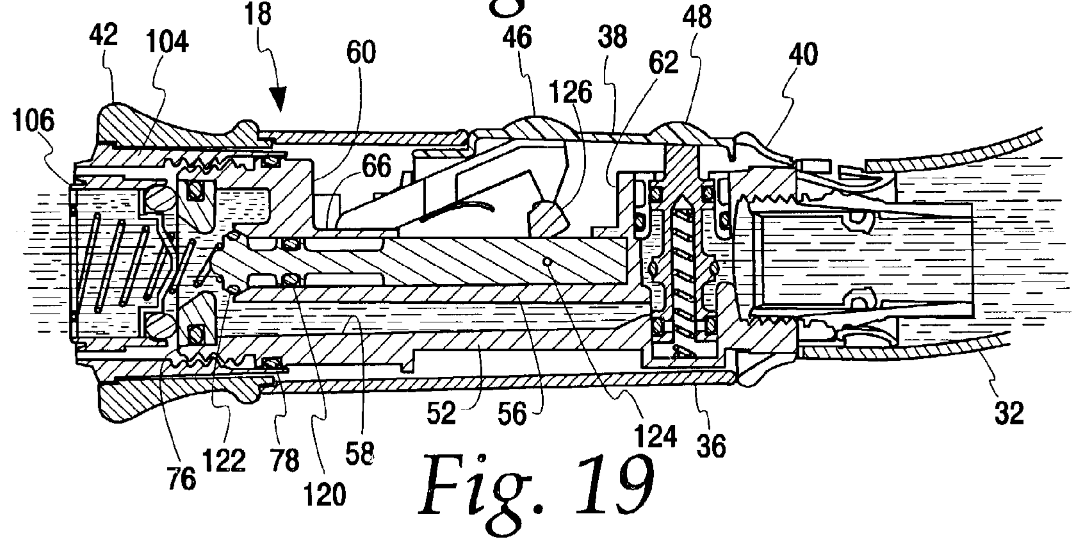
FIG. 19 is a section through the spray head assembly, showing the diverter in the stream mode position.
Figure 20:
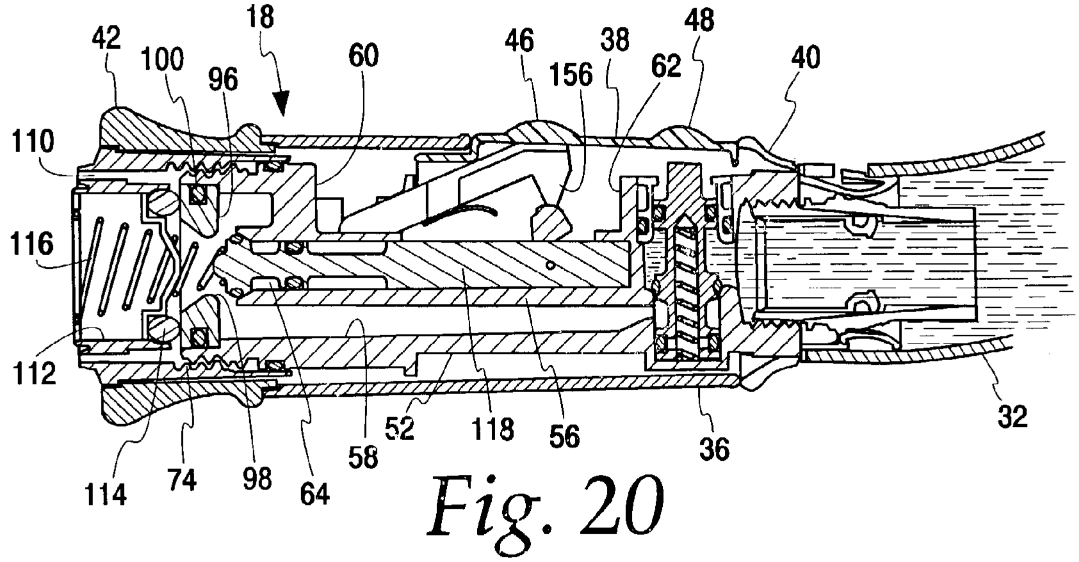
FIG. 20 is a section through the spray head assembly, showing the diverter in the stream mode position and the pause button activated.

The wand body 50 includes a cavity defined by the side walls 53, 54, floor 56 and transverse walls 62, 64. This cavity is completely isolated from the water flow path. As seen in FIGS. 18–20, a trigger, spring and diverter assembly are disposed in the cavity. The diverter assembly includes a spool 118 that is slidably mounted in the sleeve 66 and pocket 63. The spool carries a quad cup seal 120 and a face seal 122. The face seal is engageable with the first diverter seat 68 and the second diverter seat 98. The other end of the spool has a pin 124 extending transversely through the spool. The pin pivotally mounts a toggle 126 to the spool. In this embodiment the toggle is in the form of a wedge.

Details of the toggle wedge 126 are shown in FIGS. 13–15. The wedge has two sets of cam faces 128, 129 separated by a central section 130. Two loops 131 underneath the cam faces have bores that allow the loops to fully surround the pin 124. The cam faces have grooves 133 in their undersides that partially receive the pin therein. The cam faces 128, 129 in an end view of the wedge have a triangular shape with relatively sharp lower corners as at distal corners 132 and proximal corners 134.

Figure 17:
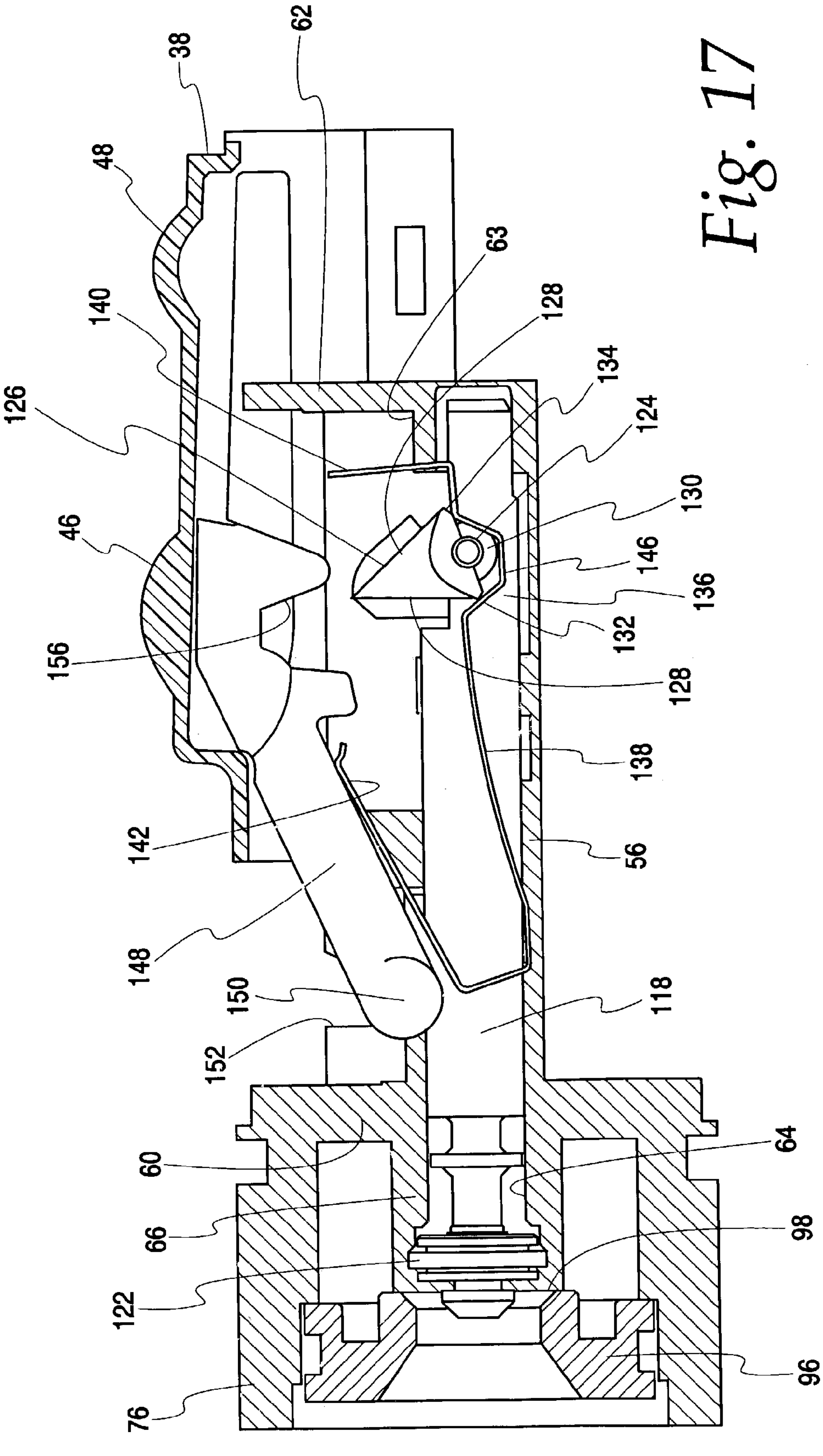
FIG. 17 is a schematic vertical section through the spray head assembly, showing the interaction among the trigger, diverter and wand body.

A trigger spring 136 is also mounted in the wand cavity. As seen in FIGS. 11 and 12, the spring has two elongated legs 138 joined at one end by an upstanding bail 140 and at the other end by a U-shaped angled portion 142. The bail 140 straddles the pocket 63 while the angled portion fits over the spool 118. The legs 138 have notches 144 that engage extensions 145 (FIGS. 4 and 8) on the inner surfaces of side walls 53, 54 to fix the longitudinal position of the trigger spring in the wand cavity. The floor 56 has wedge-shaped protrusions 147 (FIGS. 4 and 8) adjacent the extensions 145. The protrusions 147 engage the underside of the legs near the notches 144 and act as fulcrums. When the trigger is in place it presses down on the angled portion 142 distally of the fulcrums with the result that the portions of the legs proximal of the fulcrums (approximately from the notches 144 to the bail 140) are spaced above the floor and are, in effect, cantilevered from the fulcrums. This is best seen in FIG. 17. The legs also have depressions or troughs 146 disposed generally in the vicinity of the toggle wedge 126. The troughs are sized to enable them to be in registration with one of the wedge corners. When that happens one pair of cam corners will engage the legs while the other pair of cam corners will be disengaged from the spring's legs 138. This causes the toggle wedge to flip back and forth, as will be further explained below.

The trigger is shown at 148. It is pivotally mounted to the wand body by stubshafts 150 that extend into slots in the side walls 54. One of the slots is shown at 152. The trigger includes a pushbutton 154 disposed underneath the trigger dome 46 in the trigger cover 38. Underneath the pushbutton are two spaced fingers 156. Each finger is engageable with one of the cam faces 128, 129. The body of the trigger rests on the angled portion 142 of the trigger spring and is biased upwardly by the angled portion. Conversely, the angled portion is pressed down with the resulting cantilevering of the legs as just explained.

Figure 7:
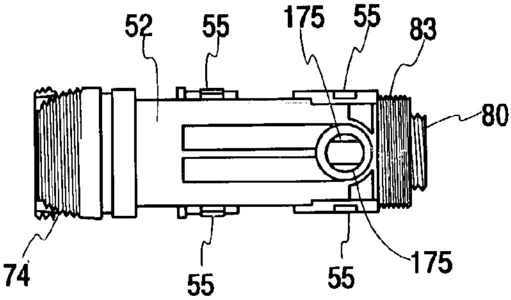
FIG. 7 is a bottom plan view of the wand body.
Figure 21:
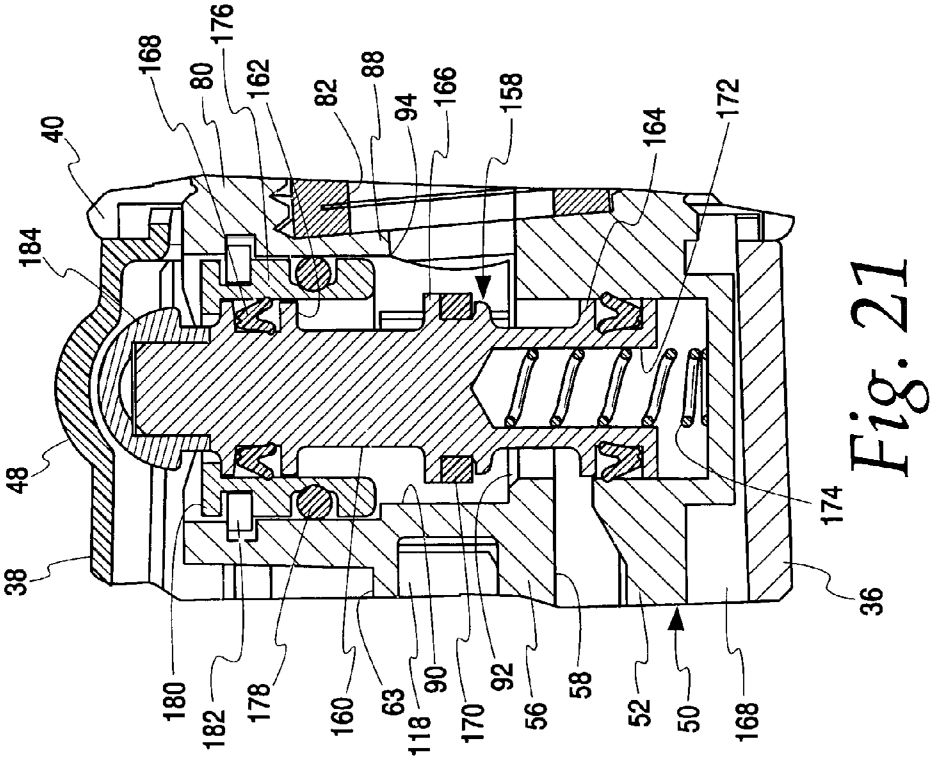
FIG. 21 is an enlarged section through the pause button portion of the spray head.

Turning now to the pause button, this structure is best seen generally at 158 in FIGS. 3 and 21. The pause button includes a pause spool 160. The pause spool has a series of flanges which form upper, intermediate and lower recesses 162, 164, 166. The upper and lower recesses receive quad cup seals 168 while the intermediate recess receives a face seal 170. The bottom of the spool 160 has a bore 172 into which fits a spring 174. The spring bottoms on the bottom wall which is vented to atmosphere by openings 175 (FIG. 7). Similarly the top of the spool chamber is vented so there is no build up of any air pressure on either side of the spool as it moves up and down. A pause spool guide 176 rests in the upper end of the pause chamber 90 and is sealed thereto by O-ring 178. A flange 180 on the spool guide engages the top flange of the upper recess 162 so as to limit upward motion of the pause spool 160. The pause spool guide 176 is retained by a U-shaped stop clip 182 that slides through slots 183 (FIG. 8) in the pause chamber walls. A flexible cap 184 sits on top of the spool 160 and underneath the pause dome 48 of the trigger cover 38.

It is pointed out that the flange outside diameters of the upper and lower recesses 162, 166 are essentially the same. This is important to maintain evenly balanced hydraulic forces on the pause spool 160. The only unbalanced forces on the spool are those applied by the spring 174 and the user. At the same time the face seal 170 needs to be larger than the quad cup seals in order to enable it to engage the seat 92. This creates an assembly problem as you need to insert the pause spool with a larger central seal into a chamber sized for engagement with two smaller quad cup seals on either side of the larger seal. The pause spool guide solves this problem. The upper portion of the pause chamber is enlarged to allow passage of the face seal 170. Then the pause spool guide fills in the extra space to allow the upper and lower quad cup seals to be the same size. If the spool guide were integral with the spool, the upper seal would have a greater area than the lower seal and the hydraulic forces on the spool would not be balanced. The separate pause spool guide resolves that issue as well as the assembly problem.

The use, operation and function of the above embodiment are as follows. Consider the pause button first. The normal condition of the pause button 158 is shown in FIG. 21. The spring 174 urges the spool 160 upwardly so the face seal 170 is spaced from the valve seat 92. Water can flow from the inlet 82 through the port 94 into the pause chamber 90, past the seat 92 and into the main flow path 58. Water pressure is present over the central portion of the spool. Since the seals 168 have equivalent, or nearly equivalent, pressurized areas, the hydraulic forces on the spool are balanced. This allows the return spring 174 to push the spool to the open position regardless of the water pressure. When a user wishes to momentarily shut off the water, he or she presses down on the pause dome 48, causing the spool 160 to move down and carry the face seal 170 into engagement with the valve seat 92. This condition is shown in FIG. 20. Water can enter the upper portion of the pause chamber but it cannot flow past the seat 92. This shuts off the water for as long as the user holds down the pause button 158. When the user releases the pause button, the spring 174 again raises the spool 160 which removes the face seal from the seat 92 and allows flow again into the main flow path 58.

Looking now at operation of the diverter assembly, it will be assumed for this discussion that the pause button is in the normal, open position. The diverter switches flow between two water delivery modes. In this case the modes are stream and spray, although it could be otherwise. The diverter starts out in its home position as shown in FIG. 19. Here the spool 118 is retracted so the face seal 122 is engaged with the first diverter seat 68. This cuts off flow into the sleeve 66 and thus flow to the branch passage openings 70 is prevented. All the flow is directed out through the poppet valve seat opening 97, into and then out of the aerator 112. This is stream mode. Meanwhile the top of the toggle wedge is leaning forwardly, i.e., toward the distal end of the spray head. This is because the spring legs 138 are in contact with the proximal wedge corners 134 while the distal wedge corners are in the troughs 146 and are thus largely unsupported. The spring legs 138 in this condition urge the wedge counterclockwise, as seen in FIG. 17. The fingers 156 of the trigger 148 rest on the proximal surfaces of the cam faces 128, 129.

When a user actuates the trigger by pushing down on the trigger dome 46, the trigger pivots in a clockwise manner (as seen in FIG. 17) about the stubshafts 150. The downward movement of the fingers 156 on the cam surfaces causes the wedge and the spool 118 to slide forwardly. As the spool moves it carries the toggle wedge with it but the trigger spring 136 remains longitudinally stationary. As the wedge moves forwardly, the spring legs flex downwardly as the distal wedge corners 132 drive up out of the troughs 146 and onto the legs 138. At the same time the proximal wedge corners 134 move out of engagement with the legs and into registration with the troughs. Thus, when the trigger is released, the legs act on the distal wedge corners to pivot the toggle wedge 126 clockwise. Now the top of the wedge leans toward the rear of the spray head and the distal surfaces of the cam faces are aligned with the trigger fingers.

At the same time as this motion of the wedge takes place, the spool 118 has carried the face seal 122 into engagement with second diverter seat 98 on the poppet valve seat 96, as shown in FIG. 18. This is the spray mode. Water flow through the valve seat 96 is prevented by engagement of the face seal 122 and second diverter seat 98. However, the forward movement of the spool has removed the face seal from the first diverter seat 68 so water can flow into the sleeve 66 and into the branch passages 71 in the embossments 69 and from there out the openings 70. Water will continue from there through the V-shaped notches 72 to the gap between the spray former's outer skirt 104 and inner ring 108. Water ultimately flows out the plurality of outlet openings 110 in spray mode.

Subsequent actuation of the trigger will move the spool 118 rearwardly. Face seal 122 will then disengage the second diverter seat 98 and reengage first diverter seat 68. At the same time the spool will drive the proximal wedge corners 134 out of the spring troughs 146 and up on to the legs 138. Simultaneously the distal wedge corners 132 will be aligned with the troughs. With the distal wedge corners thus unsupported, the legs will flip the wedge counterclockwise so the top of the wedge leans forwardly once again, readying the spool to shift to the opposite mode upon the next actuation of the trigger. In this sense the spring legs 138 and troughs 146 can be considered an over-center spring. Moving the wedge corners in and out of registration with the troughs in effect moves them over the center position of the spring and causes the state of the toggle to change.

It can be seen in FIGS. 18 and 19 that water pressure in the main flow path will maintain the spool in whatever state it is placed by the trigger. However, when water pressure is removed, either by the pause button being actuated or the mixing valve 14 being turned off, the cone spring 116 will cause the spool 118 to retract. The cone spring is selected so it is not strong enough to overcome water pressure but in the absence of water pressure, it will drive the spool to the home position.

Figure 22:
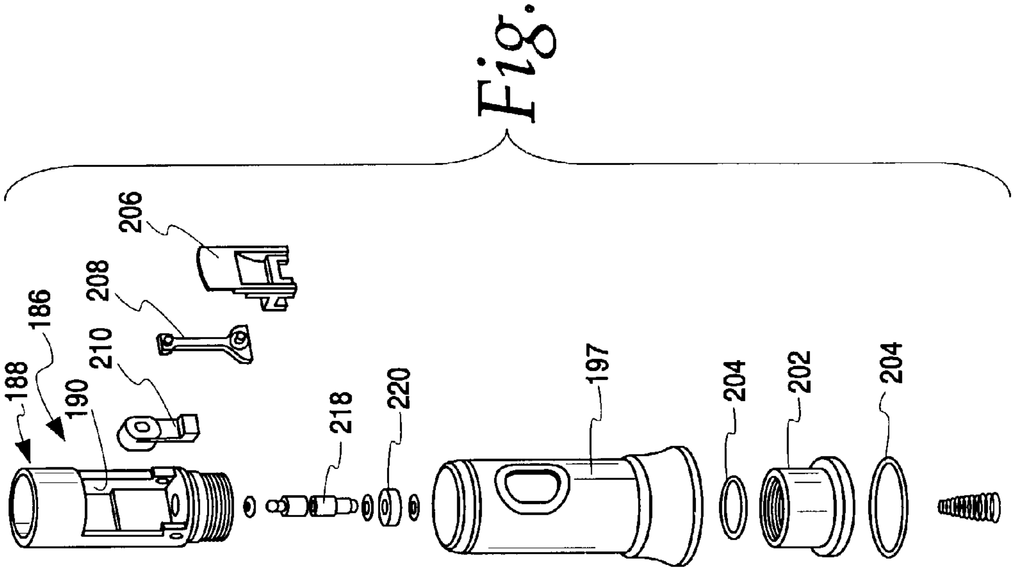
FIG. 22 is an exploded perspective view of an alternate embodiment of a spray head.
Figure 23:
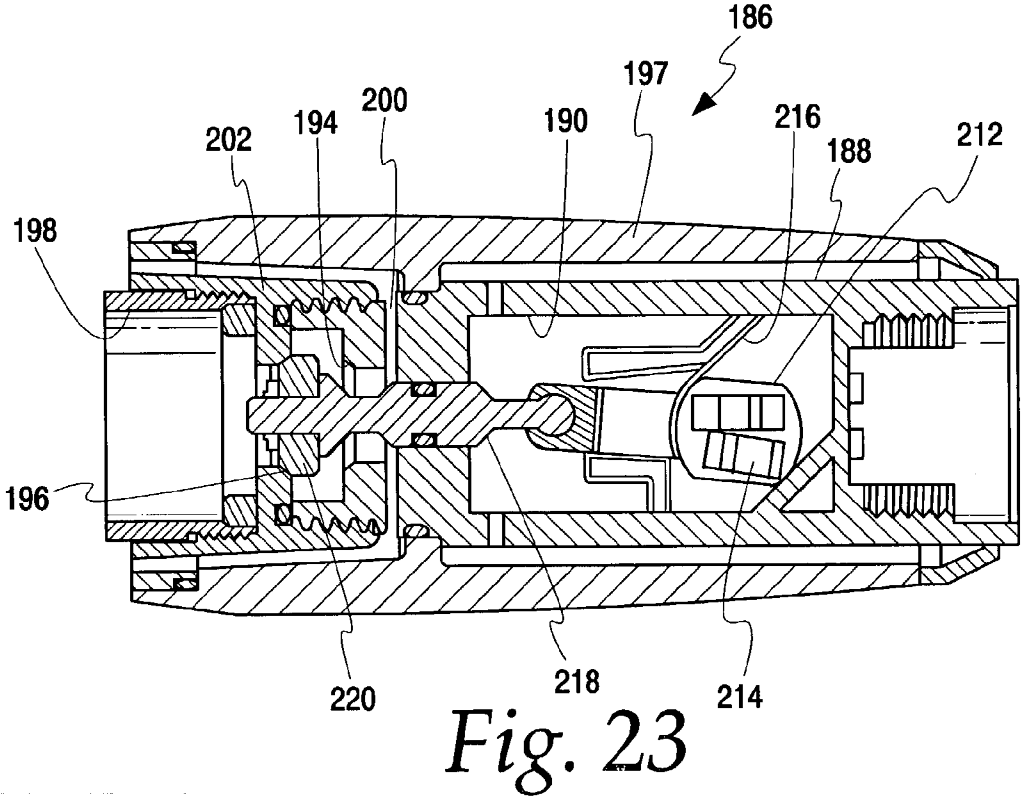
FIG. 23 is horizontal section through the spray head of FIG. 22.
Figure 24:
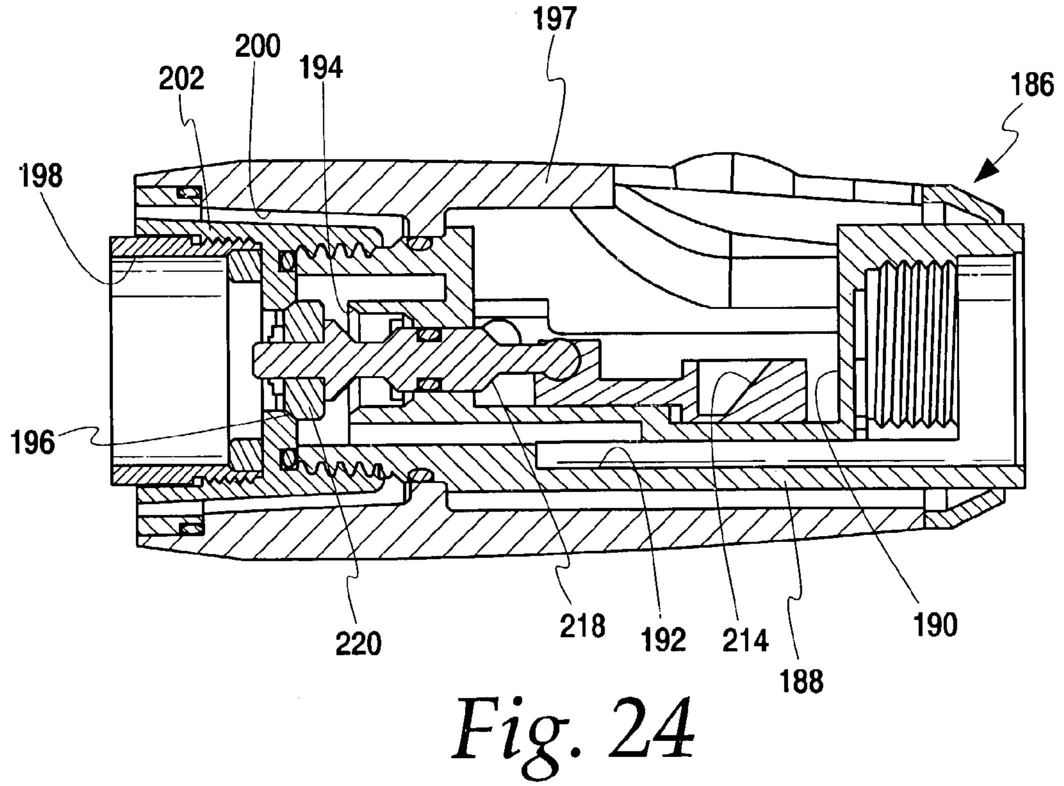
FIG. 24 is a vertical section through the spray head of FIG. 22.

An alternate embodiment of the spray head is shown generally at 186 in FIGS. 22–24. This embodiment utilizes several components whose functions are identical to those described above but they may be shaped somewhat differently. These include a wand body 188 that has a cavity 190, a main flow path 192 under the cavity and a first diverter seat 194. A second diverter seat 196 is formed in spray former 202. A wand cover 197 surrounds the body 188. A first flow passage for stream mode extends through an aerator 198. A second branch flow passage for stream mode is shown at 200 in FIG. 23. A spray former 202 with O-rings 204 is also provided. The spray head has a two-piece trigger mechanism including a trigger button 206 and a trigger lever 208. A spool driver 210 has first and second cam faces 212 and 214. The spool driver 210 is guided in a channel 216 that is formed in the floor of the cavity 190. The mode is toggled by the trigger button 206 being depressed which pushes the trigger lever 208 on to one of the spool driver cam faces 212, 214. The spool driver is connected to the end of a spool 218 in a manner that allows the spool driver to pivot. As in the embodiment of FIG. 3, the spool 218 has an elastomeric face seal 220 that is alternately engageable with one of the first and second diverter seats 194, 196. The face seal 220 closes one water path through aerator 198 when in engaging the second diverter seat 196 and closes the other water path 200 when engaging the first diverter seat 194. As mentioned, the spool driver 210 has two cam faces 212, 214, one that causes the trigger motion to move the spool driver and spool into a spray position and one that causes the trigger motion to move the spool driver and spool into the stream mode position. Only one of the cam faces is aligned with the trigger mechanism at a time. This alignment is done by the shaped channel 216 that guides and positions the spool driver cam faces appropriately for returning to stream mode when the mechanism is in the spray mode, and returning the mechanism to spray mode when in stream mode. To position the cam faces appropriately it is necessary that the trigger lever be free to pivot side to side so that it maintains contact with the cam face as the spool driver moves through the shaped channel.

In this embodiment the trigger lever 208 must center itself to the ready position after it has pushed the spool driver to the new mode position, and the trigger button 206 has been released. One way to do this is with cantilevered leaf springs on either side of the trigger lever that push it back to center when no other force is on it. Another way of centering the trigger lever is to shape the bottom pivoting portion of it and constrain the trigger lever to within the trigger button. In this way when the trigger button is released and the trigger lever rocks back, it is forced to center itself.

Whereas the preferred form of the invention has been shown and described herein, it should be realized that there may be many modifications, substitutions and alterations thereto. For example, there could be more than two water delivery modes. Preferably, one of the modes is designated a default mode which the diverter take up whenever the water is shut off. This is so a user will know what to expect when the water is next turned on. Alternatively, a spray head could have no default mode so whatever mode it was in when water was shut off will be the one it is in when water is turned back on. In the preferred embodiment there is a default mode and it is the stream mode.

We claim:

1. A spray head for discharging water, comprising:

a body having an inlet and at least first and second outlets, the body defining a water flow path including a main path and at least one branch path, the main path being in fluid communication with the inlet and one of the first and second outlets, the branch path being in fluid communication with the main path and the other of the first and second outlets;

a diverter disposed in the body and selectively movable between at least first and second positions, in one of which the diverter directs water to the branch path;

a trigger connected to the body and selectively movable between a rest position and an actuated position, the trigger being engageable with the diverter upon movement of the trigger from the rest position to the actuated position to move the diverter from whichever one of said first and second positions the diverter is in at the start of trigger movement to the other of said first and second positions;

wherein a movement of the trigger at a single point of actuation moves the diverter from said first position to said second position, and wherein an identical subsequent movement of the trigger at said single point of actuation moves the diverter from said second position to said first position.

2. The spray head of claim 1 further comprising a trigger spring mounted in the body and biasing the trigger to the rest position.

3. The spray head of claim 1 wherein the diverter further comprises a toggle engageable with the trigger upon actuation of the trigger, the toggle being movable between at least first and second states, the state of the toggle governing the movement of the diverter upon actuation of the trigger, the state of the toggle being changed by one of engagement of the trigger and toggle or engagement of the trigger and toggle followed by a release of the trigger from the toggle.

4. A spray head for discharging water, comprising:

a body having an inlet and at least first and second outlets, the body defining a water flow path including a main path and at least one branch path, the main path being in fluid communication with the inlet and one of the first and second outlets, the branch path being in fluid communication with the main path and the other of the first and second outlets;

a diverter disposed in the body and selectively movable between at least first and second positions, in one of which the diverter directs water to the branch path;

a trigger connected to the body and selectively movable between a rest position and an actuated position, the trigger being engageable with the diverter upon movement of the trigger from the rest position to the actuated position to move the diverter from whichever one of said first and second positions the diverter is in at the start of trigger movement to the other of said first and second positions;

wherein the diverter further comprises a toggle engageable with the trigger upon actuation of the trigger, the toggle being movable between at least first and second states, the state of the toggle governing the movement of the diverter upon actuation of the trigger, the state of the toggle being changed by one of engagement of the trigger and toggle or engagement of the trigger and toggle followed by a release of the trigger from the toggle; and an over-center spring engageable with the toggle to define said first and second states on either side of the center of the over-center spring, one of engagement or engagement followed by release of the trigger and toggle causing the toggle to move through the center position of the over-center spring to change the state of the toggle.

5. The spray head of claim 1 wherein the main path and diverter are arranged such that water pressure in the main path holds the diverter in the past position the diverter obtained under actuation of the trigger.

6. The spray head of claim 5 wherein one the first and second diverter positions is designated the home position and further comprising a return spring biasing the diverter to the home position, the return spring having a spring rate that is sufficient to move the diverter to the home position only in the absence of water pressure in the main path.

7. The spray head of claim 1 wherein one of the first and second diverter positions is designated the home position and further comprising a return spring biasing the diverter to the home position, the return spring having a spring rate that is sufficient to move the diverter to the home position only in the absence of water pressure in the main path.

8. A spray head for discharging fluid having a plurality of spray modes, comprising:

a body having an inlet and a plurality of outlets, the body defining a plurality of flow paths, each flow path being in fluid communication with the inlet and at least one outlet, each spray mode corresponding to at least one flow path;

a diverter assembly selectively movable between a plurality of discrete positions, in each discrete position, the diverter assembly directs fluid to at least one flow path; and an actuating device operable to change between each spray mode by a same action at a single point of actuation, wherein the same action is a downward pressing of the actuating device.

9. A spray head for discharging fluid having a plurality of spray modes, comprising:

a body having an inlet and a plurality of outlets, the body defining a plurality of flow paths, each flow path being in fluid communication with the inlet and at least one outlet, each spray mode corresponding to at least one flow path;

a diverter assembly selectively movable between a plurality of discrete positions, in each discrete position, the diverter assembly directs fluid to at least one flow path; and an actuating device operable to change between each spray mode by a same action at a single point of actuation, wherein the actuating device includes a dome and the single point of actuation is the dome.

10. The spray head of claim 9, wherein the diverter assembly includes a toggle that is operable to selectively move the diverter assembly between each discrete position.

11. The spray head of claim 10, wherein the actuating device includes a trigger that is operable to selectively move the toggle between a plurality of discrete positions, which correspond to the discrete positions of the diverter assembly.

12. The spray head of claim 11, wherein the actuating device includes a spring that is operable to bias the trigger away from the toggle.

* * * * *